(No Model.)

I. J. DUCK.
MEDICINE GLASS.

No. 566,067.  Patented Aug. 18, 1896.

WITNESSES:
John Buckler
C. Gerst

INVENTOR
Ida J. Duck,
BY
Edgar Tate & Co
ATTORNEYS.

UNITED STATES PATENT OFFICE.

IDA J. DUCK, OF SALEM, OHIO.

MEDICINE-GLASS.

SPECIFICATION forming part of Letters Patent No. 566,067, dated August 18, 1896.

Application filed October 28, 1895. Serial No. 567,155. (No model.)

*To all whom it may concern:*

Be it known that I, IDA J. DUCK, a citizen of the United States, and a resident of Salem, in the county of Columbiana and State of Ohio, have invented certain new and useful Improvements in Medicine-Glasses, of which the following is a specification, reference being had to the accompanying drawings, forming a part thereof, in which similar letters of reference indicate corresponding parts.

This invention relates to medicine-glasses, such as are intended for use in taking medicine when it is desired to take water immediately thereafter; and the object thereof is to provide an effective device of this class which is simple in construction and operation, while being comparatively inexpensive.

The invention is fully disclosed in the following specification, of which the accompanying drawings form a part, in which—

Figure 1:
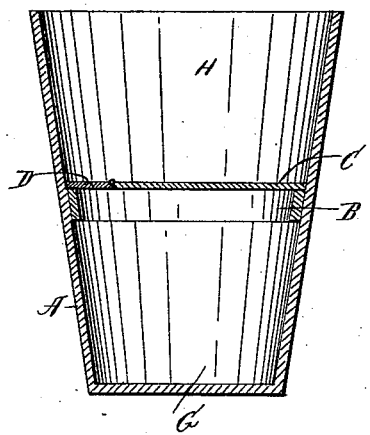
Figure 2:
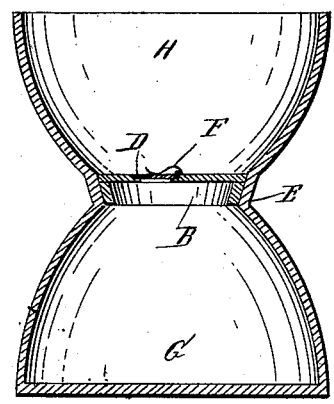
Figure 3:
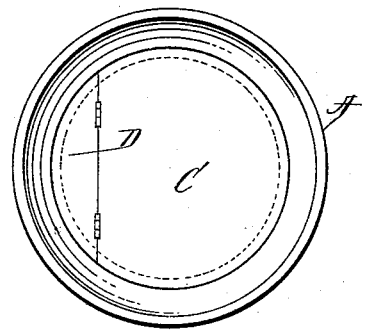

Figure 1 is a central vertical section of one form of medicine glass or tumbler, made according to my invention; Fig. 2, a similar view of a modified form of construction, and Fig. 3 a plan view thereof.

In the practice of my invention I provide a glass or tumbler A, which may be of any preferred form, and the ordinary glass or tumbler may be employed, and within said glass or tumbler I place a ring B, which may be formed therein or secured thereto in any desired manner, and if formed separately from the glass or tumbler it may be composed of any desired material.

Above the ring B is placed a partition-plate C, with which is connected a hinge-valve D, which opens outwardly, and the plate C and valve D completely close the opening through the ring B, or separate the upper and the lower parts of the glass or tumbler.

In Fig. 2 I have shown a modified form of construction, in which the glass or tumbler is contracted at or near the middle thereof, as shown at E, and the valve D is placed near the central portion of the plate C, and I also provide a spring F, which is adapted to hold the valve seated, but which is not strong enough to prevent the opening thereof in the operation hereinafter described.

The operation will be readily understood from the foregoing description when taken in connection with the accompanying drawings. Whenever it is desired to take medicine in a fluid condition and to take water immediately thereafter, the water is placed in the bottom G of the glass or tumbler, and the valve B being closed, the medicine is placed on the partition C, or in the upper part H of the glass or tumbler, and when the medicine is taken the valve D will open under the action of gravity and the pressure of the water within the glass or tumbler, and the latter will flow out, following the medicine, as will be readily understood.

Although I have described my improvement as a medicine-glass, it is evident that it may be used for other purposes, and my invention is not limited to the use thereof herein specified. The partition C and the valve D may be made of any desired material, as may also the tumbler or vessel in which the same are placed.

Having fully described my invention, I claim and desire to secure by Letters Patent—

1. A tumbler or other vessel which is contracted near the middle thereof, and provided with a partition-plate in which is placed a valve which opens outwardly, said valve being provided with a spring which is adapted to hold the same closed, substantially as shown and described.

2. A tumbler or other vessel which is contracted near the middle thereof, and provided with a partition-plate in which is placed a valve which opens outwardly, said valve being provided with a spring which is adapted to hold the same closed, and said tumbler or vessel being provided with a ring on which said partition and valve are placed, substantially as shown and described.

In testimony that I claim the foregoing as my invention I have signed my name, in presence of the subscribing witnesses, this 24th day of October, 1895.

IDA J. DUCK.

Witnesses:
MARION L. HOLE,
ROBERT HOLE.